United States Patent [19]

Sanders

[11] Patent Number: 5,815,713
[45] Date of Patent: Sep. 29, 1998

[54] METHOD AND SYSTEM FOR AUTOMATED TRANSFORMATION OF DECLARATIVE LANGUAGE PROCESS SPECIFICATIONS

[75] Inventor: Paul Sanders, Surbiton, England

[73] Assignee: Sterling Software, Inc., Dallas, Tex.

[21] Appl. No.: 473,691

[22] Filed: Jun. 7, 1995

Related U.S. Application Data

[63] Continuation-in-part of Ser. No. 421,337, Apr. 13, 1995, Pat. No. 5,758,032.
[51] Int. Cl.$^6$ ........................................................ G06F 9/45
[52] U.S. Cl. ............................................ 395/702; 395/707
[58] Field of Search ..................................... 395/700, 650, 395/705, 706, 707, 708, 702

[56] References Cited

U.S. PATENT DOCUMENTS

| | | | |
|---|---|---|---|
| 5,084,876 | 1/1992 | Welham et al. | 395/183.02 |
| 5,212,791 | 5/1993 | Damian et al. | 395/650 |
| 5,301,317 | 4/1994 | Lohman et al. | 395/600 |
| 5,442,792 | 8/1995 | Chun | 395/706 |
| 5,448,740 | 9/1995 | Kiri et al. | 395/708 |
| 5,487,135 | 1/1996 | Freeman | 395/75 |
| 5,557,788 | 9/1996 | Inoue | 395/700 |

OTHER PUBLICATIONS

Cohen, Donald, "*Automatic Compilation of Logical Specifications into Efficient Programs*," Science, ???, pp. 20–25.
Feather, Martin S., "*A Survey and Classification of some Program Transformation Approaches and Techniques*," in IFIP 87 Congress, North Holland, 1987.

Sanders, P., Short, K., "*Declarative Analysis in Information Engineering*," appeared in Case –Current Practice, Future Prospects, (Edited by Kathy Spurr and Paul Layzell), Wiley Press, 1992.

Morgan, C., Robinson, K., "*Specification Statements and Refinement*", IBM Journal of Research and Development, vol. 31, No. 5, Sep. 1987, pp. 546–555.

Van Melle, William J., "*The Rule Compiler*", System Aids in Constructing Consultation Programs, UMI Research Press, 1981, pp. 83–110.

*Primary Examiner*—Emanuel Todd Voeltz
*Assistant Examiner*—Peter J. Corcoran, III
*Attorney, Agent, or Firm*—Baker & Botts, L.L.P.

[57] ABSTRACT

The present invention transforms a declarative language specification of a problem into a procedural language specification of the problem. The present invention includes a partitioning module (16) for partitioning the problem into a set of sequenced, independent sub-problems in accordance with a set of refinement laws and an implement module (30) for generating procedural language implementations of each of the sub-problems using a set of domain specific heuristics applied by a guaranteed sharing module (22), a selection module (24), a share module (26) and a prune module (28) to a set of options generated by a form option module (20) for each of the sequenced, independent sub-problems in accordance with a given optimization level.

10 Claims, 5 Drawing Sheets

METHOD AND SYSTEM FOR AUTOMATED TRANSFORMATION OF DECLARATIVE LANGUAGE PROCESS SPECIFICATIONS

This is a continuation-in-part of application Ser. No. 08/421,337 filed Apr. 13, 1995, now U.S. Pat. No. 5,758,032.

NOTICE

Copyright© 1994 Texas Instruments Incorporated

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD OF THE INVENTION

This invention relates to automated code generators, and more particularly, it relates to a method and system for automated transformation of a declarative language process specification to a procedural language process specification.

BACKGROUND

Solutions to business problems are often specified as processes capable of being solved by a variety of methods, including methods implemented in computer software. Process solutions which are implemented in software are often specified using a procedural language. A procedural language specification of the process solution specifies the exact sequence of steps to be followed in order to complete the process. Procedural language specifications are useful in that they are easily transformed into a form executable on a computer. Examples of procedural languages are C, Cobol and Pascal. Another procedural language is Action Diagram Language as used in Composer by IEF™, Release 5.3, a Computer Aided Software Engineering (CASE) tool, a product of the assignee, Texas Instruments Incorporated and described in the IEF™ Electronic Book with TI Part Number 2616313-0001, herein incorporated by reference in its entirety.

Specifying process solutions directly into a procedural language specification, however, introduces several problems. First, by specifying the process solution directly using a procedural language, there is no separation between what the process does and how it does it. This means that a generic business rule for addressing the same problem in the future cannot be expressed without also addressing additional concerns specific to the procedural language used such as code efficiency. The procedural language specification generated directly from the generic business rules is generally a specification that is more complex and not easily communicated, verified or changed.

A second problem with generating the procedural language specification directly from the process solution is that the procedural language specification is often de-normalized in that a single business rule may have to be specified in many different places. This again makes the specification more difficult to change and increases the likelihood of error.

Furthermore, when the procedural language specification of the process solution is generated directly from the process solution, the procedural language specification often must be expressed using only low level constructs. For a large or complex process, this means, in most cases, that the procedural language specification is also large and complex. Again, the likelihood of error is increased.

An alternative approach is to first specify the process solution using a declarative language (e.g., predicate calculus), and then to translate the declarative language specification into an equivalent procedural language specification. A declarative language specification of a process solution specifies what the process must do in a form that is largely independent of how the process should do it. Declarative languages are generally based on sound mathematical principals and permit descriptions at a high level of abstraction. Examples of declarative languages based on mathematical logic include Programming in Logic (PROLOG), structured query language (SQL) and Z.

Specifying the process solution using the declarative language addresses some of the problems caused by using the procedural language, however, this approach in turn introduces other problems. First, directly executing the declarative language specification is often either impossible or too inefficient for commercial systems. Therefore, the declarative language specification is usually manually converted to the procedural language specification. However, manually generating a procedural language specification from a declarative language specification does little to decrease the likelihood of error. Furthermore, both the declarative language specification and the manually generated procedural language specification must be modified whenever changes are required. Thus, some of the advantages gained from specifying a process solution in a declarative language instead of immediately generating a procedural language specification are lost.

Therefore, what is needed is a method and system that automatically translates a declarative language specification of a process solution into an equivalent procedural language specification that implements the declarative language specification in as efficient a manner as possible.

SUMMARY

The present invention includes a method and system for automated transformation of a declarative language specification of a process into a procedural language specification of the process. The present invention repeatedly applies refinement laws to the declarative language specification in accordance with a set of domain specific heuristics and a given optimization level to transform it into the procedural language specification with the lowest associated cost. The present invention applies these refinement laws by recursive use of a number of modules. Those modules include a partitioning module which partitions the problem into a set of sequenced, independent sub-problems; and a form options module, a guaranteed sharing module, a select module, a share module, a prune module and an implement module transform each of the sub-problems.

BRIEF DESCRIPTION OF THE DRAWINGS

For a better understanding of the present invention, reference may be made to the accompanying drawings, in which.

DETAILED DESCRIPTION OF THE INVENTION

Figure 1:
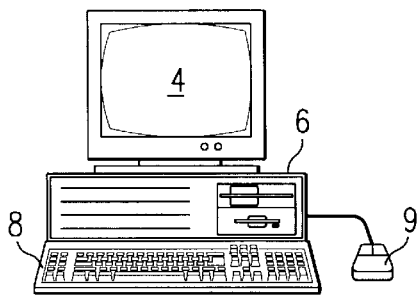
FIG. 1 is an exemplary computer used to implement the current embodiment of the present invention.

The present invention automatically translates a declarative language specification of a process solution into a procedural language specification optimized in accordance with a given cost model and optimization level. The resulting procedural language specification of the process solution is generated using and is in a form suitable for execution by a general purpose computer, such as the one illustrated at 2 in FIG. 1. The computer 2 includes a display 4, a processing unit 6, a keyboard 8 and a mouse 9.

Figure 2:
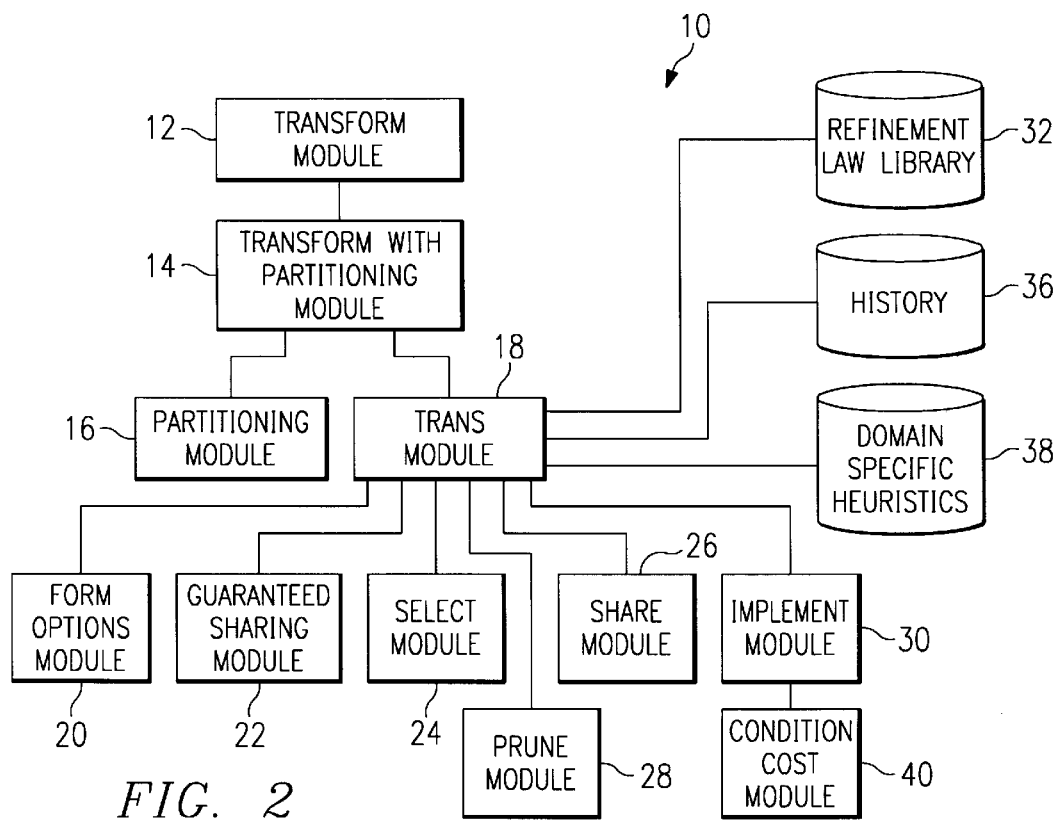
FIG. 2 shows a block diagram illustrating the present invention.

The current embodiment of the present invention, as illustrated in FIG. 2, is implemented using the programming language PROLOG, although it is contemplated that one of several other computer programming languages may be used, and translates the declarative language specification of the process solution into an equivalent procedural language specification implemented in Action Diagram language. The Action Diagrams are then used to generate, i.e., using the CASE tool Composer by IEF™, SQL code which is executed against a target database management system (DBMS), e.g., DB2™, a product of IBM.

The declarative language specification is expressed in terms of preconditions and postconditions using the form [pre, post].

The [pre, post] form can be read: "If the precondition is satisfied, the process must terminate in a state that satisfies the postconditions. If the precondition is not satisfied, the final state is undefined (indeed, the process may never terminate)".

The postconditions are expressed as a set of rules. As defined by Paul Harmon and David King in the text entitled *Expert Systems* published in 1985 by Wiley Press, a rule is merely a conditional statement in which the first part, i.e., if clauses, establishes conditions that must apply if a second part, i.e., then clauses, or actions, is to be acted upon.

The path from a declarative language specification thus can be described as a series of refinements, each of which takes one step towards the solution (the solution being the procedural language specification that implements the declarative language specification). Each refinement may introduce a construct of the target procedural language, or may modify the declarative language specification leaving sub-problems that must also be solved.

Each refinement is the result of applying a particular refinement law. Each refinement law has various conditions that must hold for it to be validly applied.

The present invention includes a refinement law library 32 which includes refinement laws for refining the declarative language specification to the procedural language. The refinement laws included in the refinement law library 32 are specific to the declarative language in which the declarative language specification is expressed, the target procedural language into which the declarative language specification is transformed, and the general nature of the process defined in terms of the declarative language.

Each refinement law has various conditions that must hold for it to be validly applied, and each application of a refinement law of a particular type may produce sub-problems still to be solved. There are several types of refinement laws included in this embodiment of the present invention which include:

take an action, by use of an action diagram SET, ESCAPE or INCREMENT statement: this generates a single sub-problem, consisting of all the remaining rules;

test a condition, by use of an action diagram IF, READ or READ EACH statement: this generates two sub-problems: the set of rules to be implemented within the success branch of the test (the positive set), and the remaining rules to be implemented afterwards (the remaining set). (The prototype does not treat negation, and therefore does not require rules in the failure branch of the test.) Each of the original rules can independently be distributed between these two sets, as follows:

completed within positive set: the rule may be placed in the positive set, after removing the condition tested from it;

flagged within positive set: a rule to set a flag may be placed in the positive set, and the original rule placed in the remaining set after substituting the condition tested by a test of that flag;

accumulated within positive set: to handle aggregate expressions, a rule to increment (one or more) accumulators may be placed in the positive set, and the original rule placed in the remaining set after substituting (one or more) aggregate expressions, TOTAL( . . . ) by the appropriate accumulator;

completed within remaining set: the rule may be placed unchanged in the remaining set;

partition: the set of rules may be partitioned into N independent sets, where implementing each of the N sets sequentially will implement the original set of rules; and make logical simplification: the specification may be rewritten to any logically equivalent form.

In the current embodiment of the present invention, a number of these refinements may be combined into a single step.

Examples of other refinement laws that could be consider for inclusion are "test a condition on first iteration only", "cache a table in a local repeating group view", or "implement recursion by use of a stack".

An exemplary refinement law is described in Appendix B, herein incorporated by reference in its entirety.

At each point, there are a number of refinement laws that can validly be applied, and a number of different ways of applying any particular refinement law, where different choices lead to different action diagrams that implement the declarative language specification.

Each possible action diagram is costed in terms of its estimated execution time according to a cost model defined by this embodiment of the current invention. This generally means predicting the access plan that will be selected by the target DBMS for each action diagram statement generated, and estimating the cost of such an access plan.

The refinement law library 32 therefore defines a search space which is used in the present invention to find the sequence of refinements that produce the action diagram with the lowest estimated cost.

The current embodiment of the present invention explores this search space in a particular manner. It is contemplated, however, that various changes, substitutions and alterations can be made thereto without departing from the spirit and scope of the present invention.

In the current embodiment of the present invention, each module is described in terms of its behavior at the highest level of optimization. Thus, the present invention further provides for user definable levels of optimization. At higher levels of optimization, the transformation process itself will take longer, but the resulting action diagrams are more efficient. The present invention, however, also permits the user to specify a maximum execution time whereby the transformation process automatically reduces the level of optimization, if necessary, in order to complete the transformation task within the predefined time limited.

The transformation process used in the current embodiment of the present invention applies the following search techniques:

(1) A bounded, depth-first search is conducted over the search space of possible action diagrams, such that an option is not explored if it is guaranteed to be worse than the current best option already explored.

(2) A history is maintained of the sub-problems solved and action diagram statements costed, to avoid repeating effort. Therefore, upon starting each problem, the current embodiment of the present invention attempts to match the problem with the existing history to determine if an equivalent, or simpler, problem has previously been processed.

(3) Domain specific heuristics are used to select the best options at various points, with other options either not being explored at all or explored second (thereby reducing the generation time). The domain specific heuristics included are based upon the cost model used, and an estimate of a predefined standard. The exact set of domain specific heuristics applied depends upon the optimization level requested.

The current embodiment of the present invention includes several data structures which include a problem data structure, a solution data structure, a state data structure, an option list data structure and a history data structure. Each of the data structures are implemented in the current embodiment of the present invention as PROLOG data structures stored as transient objects in the memory of the computer 2.

The problem data structure, described in detail in Appendix A, herein incorporated by reference in its entirety, defines the problem to be solved in terms of a list of rules to be implemented and a list of dependencies between these rules which must be maintained. These rules are expressed against an entity-relationship-attribute data model, such as the exemplary entity-relationship-attribute data model shown in FIG. 8 and described in detail hereinbelow. The dependencies define any required sequence in which the rules can be satisfied.

The solution data structure includes the resulting solution in the form of an action diagram and an estimated cost of the action diagram.

The state data structure includes information relevant to the current state of the transformation and includes any information on flags that are introduced during the transformation, including the probability of the flag being set at the current state of the transformation.

The options data structure is generated for each problem and used in determining which options to consider for the next step in the transformation process. The options data structure is not maintained between steps and is a list of the actions whose conditions are known to hold and a list of conditions what could be tested now, along with the rules to be implemented if the condition holds.

The history data structure includes the transformation results of previous problems encountered and previous conditions costed. The history data structure is thus used to store the results of transforming each problem encountered during the transformation and the results of costing various action diagram elements during the transformation.

FIG. 2 shows at 10 a block diagram the present invention which includes a transform module 12 which is coupled to a transform with partitioning module 14. The transform with partitioning module 14 is coupled to a partitioning module 16 and a trans module 18. The trans module 18 is connected to a form options module 20, a guaranteed sharing module 22, a select module 24, a share module 26, a prune module 28 and an implement module 30. A condition cost module 40 is coupled to the implement module 30. The trans module 18 is also coupled to a refinement law library 32, a history file 36 and a domain specific heuristics file 38. The operation of each of the modules is discussed in detail hereinbelow.

Figure 3:
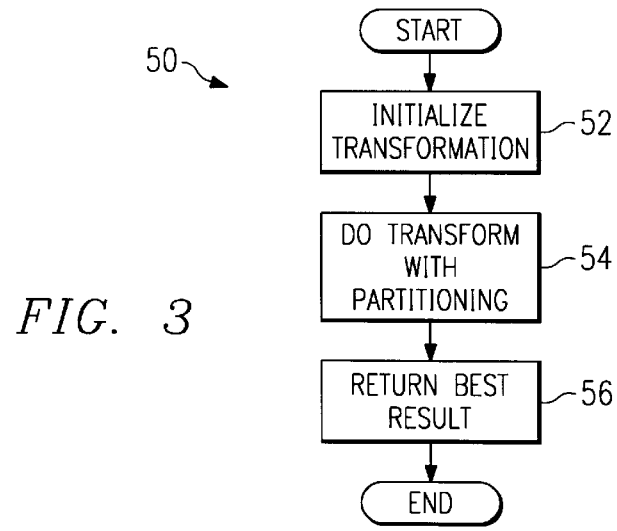
FIG. 3 shows a flow diagram illustrating the operation of the transform module in the current embodiment of the present invention.

The highest level module, to which a problem is initially given, is the transform module 12. As shown in the flow diagram in FIG. 3, the transform module 12 performs initialization at block 52 and then calls the transform with partitioning module 14 at block 54, which is recursively called during the transformation to process sub-problems generated after each refinement.

Given a problem definition, defined using the problem data structure, and the level of optimization as inputs, the transform module 12 returns, in the solution data structure as shown at block 56, the best solution found which includes the cost as estimated during the transformation.

The transform module 12 delegates a majority of the problem to the transform with partitioning module 14. Given a problem and a maximum cost for the solution, the transform with partitioning module 14 returns the best solution found or "null" if no solution can be found for less than the maximum cost specified.

Figures 4, 5:
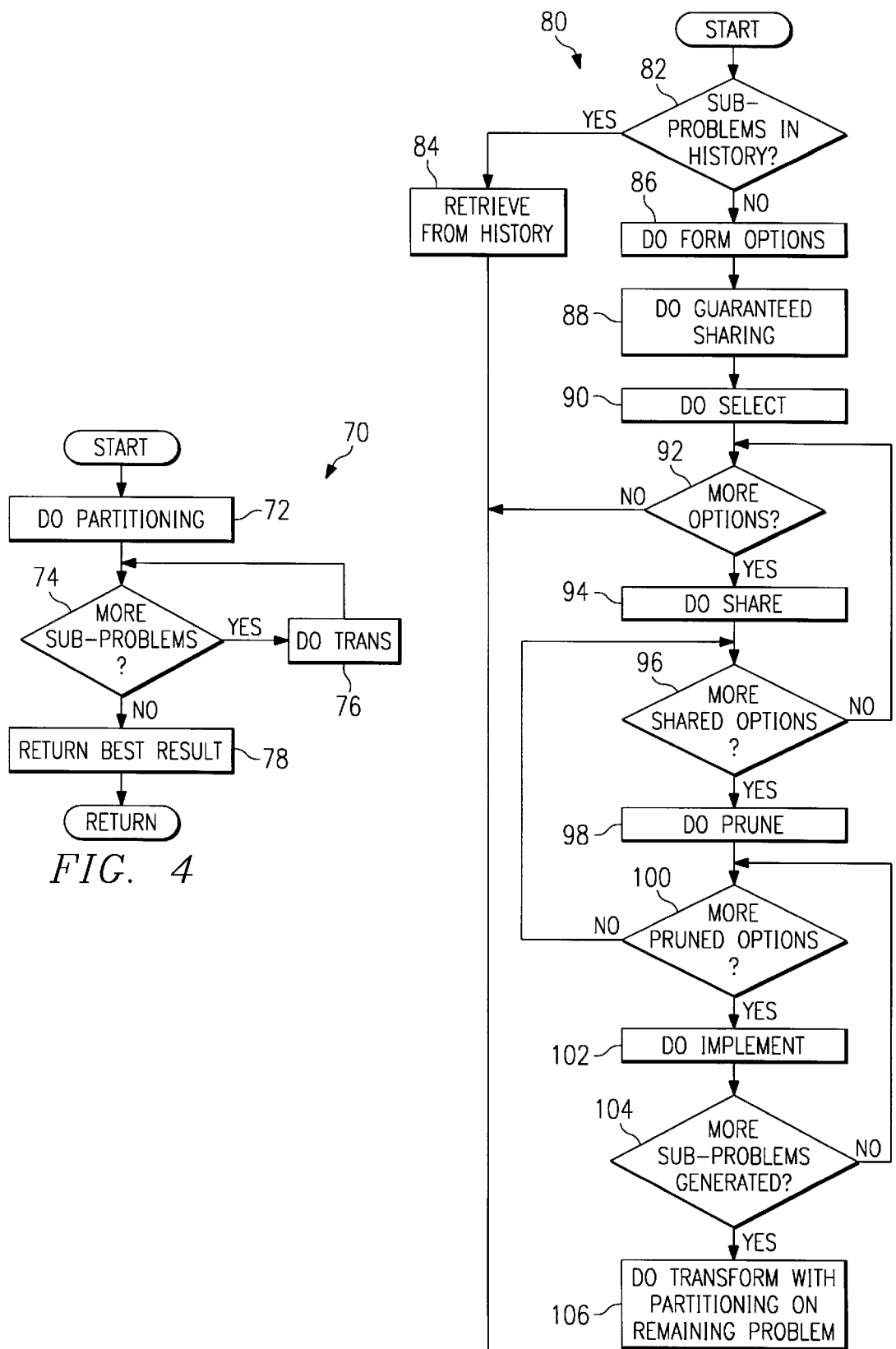
FIG. 4 is a flow diagram illustrating the operation of the transform with partitioning module in the current embodiment of the present invention.
FIG. 5 shows a flow diagram illustrating the operation of the trans module in the current embodiment of the present invention.

The operation of the transform with partitioning module 14 is shown in the flow diagram in FIG. 4. The transform with partitioning module 14 partitions the problem, as shown at block 72, into independent problems using the partitioning module 16 then invokes the trans module 18 at block 76 to process each one of the independent problems in turn through decision block 74. The best result found is returned at block 78 to the transform module 12.

The trans module 18, the operation of which is described in the flow diagram shown in FIGS. 5A and 5B, uses history data from the history file 36, if possible as shown in decision block 82, retrieving a previous solution found at block 84 for the current independent problem. Otherwise, the trans module 18 generates and explores all options appropriate to the optimization level in effect, invoking, directly or indirectly, the form options module 20 at block 86, the guaranteed sharing module 22 at block 88, the select module 24 at block 90, the share module 26 at block 94, the prune module 28 at block 98, and the implement module 30 at block 102, and recursively invoking the transform with partitioning module 14 at block 106 for each sub-problem generated during the implementation by the implement module 30 at block 102 of each option as determined at decision block 104.

Each option is explored in turn with the exploration constrained by the best solution found from the exploration of previous options.

All sensible options are explored. While it is possible to use the information gained from exploring one option to judge whether exploring a latter option is worthwhile, it is considered that this adds unnecessary complications. Duplicate options can be generated and each explored independently but, because of the use of the problem history, this is not a critical problem.

Given a single problem, the partitioning module 16 returns a sequenced set of independent sub-problems such that implementing each of these independent sub-problems in sequence will implement the problem given without significantly increasing the total cost of the solution relative to generating a solution to the problem as a whole.

In determining the sequenced set of independent sub-problems, the list of rules in the problem data structure defining the problem are partitioned by the partitioning module 16 into as many different sets as possible, while ensuring that no opportunity to share processing between rules is lost (i.e. any two rules that include the same unground view, or the same attribute, must be in the same set) and that each set can be sequenced such that the dependencies between the rules as defined by the list of dependencies in the problem data structure are maintained.

'View' is a term used in Composer by IEF, a product of the assignee, Texas Instruments Incorporated, for a variable of a certain type. For example, the view called 'primary customer' is a variable of type 'customer'. Currency is established on a view by means of an action diagram READ or READ EACH statement. The term 'ground view' is used to describe a view on which currency has been established; the term 'unground view', is used otherwise.

For all optimization levels, the sets are then sequenced in such a manner as to obey the dependencies while processing any set which includes an ESCAPE action before one that does not. Each set is then solved as an independent sub-problem.

Given an independent sub-problem generated by the partitioning module 16, the form options module 20 returns an initial list of options for the sub-problem. Each option is a possible next step, with a step being either (1) to take some action or (2) to test some condition and then recursively implement one set of rules if the condition is met and another set of rules regardless of whether the condition is met or not.

The form options module 20 decomposes each rule into its various component conditions, each component condition cross referenced to the rule in which it appears. An options list is generated for the set of rules which include a list of actions that could be taken next, and the conditions that may be tested next along with the way in which each condition could be shared across different rules.

The guaranteed sharing module 22 is invoked to apply the "Guaranteed Sharing" heuristics, stored in the domain specific heuristics file 38, to the list of options generated by the form options module 20. Given the options list generated by the form options module 20, the guaranteed sharing module 22 returns an options list updated with all sharing between conditions that is guaranteed to produce an advantageous result (as determined heuristically using the Guaranteed Sharing heuristics). Application of the Guaranteed Sharing heuristics detects cases where it is definitely advantageous to share effort between two rules, avoiding the need to conduct an additional search.

The Guaranteed Sharing heuristics include: (1) common ground conditions (those referring to current views) may always be shared; (2) if the common part of the two conditions includes all the views appearing in those conditions, then the two conditions may always be shared; (3) if it is certain that given the two conditions independently the target DBMS would start both of them in the same way, then, subject to certain provisos, the condition that defines this "common start" may always be shared.

The additional provisos that must be checked ensure that it is safe to share given the context of the conditions, in particular when they are included within the same action.

Given the options that should be considered for selection, the select module 24 returns the selected option that should be explored next and a set of alternative options that should still be considered. The select module 24 applies "Selection" heuristics from the domain specific heuristics file 38 in making the determination. The alternative options are a smaller set of options, sequenced in order of preference. The sequencing is also determined heuristically using the Selection heuristics.

In general, it is necessary to try all possibilities included in the options list. The Selection heuristics are applied to detect cases where the number of options can be greatly reduced and also to increase the likelihood of the best option being explored first.

First, a rule which is free of any dependencies is selected, with ESCAPE rules being selected preferentially (the same approach is adopted for the heuristic sequencing of action sets following partitioning). The condition will then be selected from this rule (or one which "overlaps" with it).

The heuristics for this selection are:
(1) if one of the conditions is definitely required in some rule, and there is no unnecessary commitment in testing it now, then that condition may be selected and no other alternative considered;
(2) otherwise, all pointless options are removed, and a selection made from the remainder on the basis of cheapest first (using an approximate cost measure) and within this, preferentially selecting those that appear in the most rules. There are a number of heuristics used in determining whether selecting a condition is considered pointless, all based upon the following:
 (a) selecting a condition is pointless if it always appears with one that is much cheaper;
 (b) selecting a condition is pointless if it relates to the action part if there is still an unsatisfied condition (for example, to find the total order quantity if some condition is met, do not start by retrieving all the orders, however complex that condition).

By no means do the selection heuristics cover all of the special cases that could occur. In particular, the set of alternatives could be more selectively generated (e.g., by not considering different conditions as alternatives if they are guaranteed to be met, as is true for "horizon gathering" down mandatory relationships. However, the current set of selection heuristics applied increase the likelihood of making good selections in many cases.

Given a single option and a complete list of available options, the share module 26 returns a set of options, each option in the set of options returned representing a way of sharing as much as possible of the single option with one or more of the other options in the list of vialable options.

Thus, the share module 26 determines all the possible shared conditions. The share module 26, however, only considers the possibility of sharing between two conditions if it can do so without violating associated "Connectivity" heuristics, also included in the domain specific heuristics 38. Applying the Connectivity heuristics means that even if two conditions overlap, they will not be shared if each condition independently included a relationship with a ground view, a view on which currency has already been established, yet the overall condition did not. Otherwise, the share module 26 would share as large a part of the overlap condition as possible and determine which view should be the one read. It is up to the calling trans module 18 to determine if in fact only part of the condition should be shared if this would be more efficient. The trans module 18 makes this determination by calling the prune module 28 for each shared condition.

The prune module 28 is given a condition, C, that is shared between two or more conditions C1, C2, . . . Cn, where C is the maximum common overlap between the Ci's, where i is an integer. In response, the prune module 28 returns all of the conditions less than or equal to C that should be considered as options.

The options arise if it is possibly more efficient to share less than the maximum common overlap, C, or if C includes some construct that the target DBMS does not support. This is done by working outward, building up the condition, in light of the possible access paths that the target DBMS might reasonably take for each of the Ci's.

Given an option, the full problem and a maximum cost, the implement module 30 returns the best solution found to implement that option. This solution includes the action diagram statements needed to implement the option itself and the action diagram statements needed to implement any actions that are to be satisfied in the positive branch of the condition, as found by recursively calling the transform with partitioning module 14.

In addition to the best solution found, the implement module also returns the remaining problem that must still be solved. Recursively calling the transform with partitioning module 14 to solve the remaining problem is the responsibility of the trans module 18.

Any condition tested may be extended by the implement module 30 with a "guard condition". A guard condition is based upon the conditions of all the rules in which the tested condition appears. Extending the tested condition with a guard condition removes wasted effort in some instances (generally, extending the tested condition with a guard condition simply includes a disjunction of conditions on a READ or READ EACH; it may, however, include the introduction of an IF statement guarding the tested condition). An estimated cost of testing the condition is then obtained. The problem is then split into two parts: the rules to be implemented within the success branch of the test (the positive set) and the remaining rules to be implemented afterwards (the remaining set).

During the splitting process, rules to increment accumulators are added and the rules rewritten to use such accumulators and a decision is made as to which rules, if any, to delay. Delaying a rule means that instead of completing it within the positive set, the implement module 30 will delay its completion to the remaining set. This is done if completing the processing of that rule within the positive set will violate the dependency requirements or will cause the opportunity to conduct sharing between that rule and some other rule in the remaining set to be missed. If the condition being tested is non-trivial (i.e. not simply an IF statement) then the implement module 30 ensures that it need not be retested by setting a flag in the positive set and rewriting the other rules to test the state of that flag instead of retesting the condition.

The rules in the positive set are then transformed within a cost based upon the maximum cost given and the cost of this condition by recursively calling the transform with partitioning module 14.

Given a condition, the condition cost module 40 returns the filter factor (a number representing the estimated number of times that this condition will be met) and the cost of testing the condition (measured in disk page accesses).

For conditions implemented by IF statements or READ statements, the filter factor is a number between 0 and 1 representing the probability that the condition is met. For conditions implemented by a READ EACH statement, the filter factor is a number greater than 0 representing the estimated number of occurrences that will meet the condition.

The cost model implemented by the condition cost module 40 only takes efficiency into account, ignoring other properties of an action diagram such as size, locking characteristics and clarity. The cost is measured in terms of the number of disk page accesses. The estimate is based upon the action diagram statements, the data structure design and the model statistics defined as part of the data model that define estimated number of occurrences of each entity type and relationship.

In the current embodiment of the present invention, the cost of all action diagram statements apart from READ and READ EACH statements is taken as 0. The cost of a READ or READ EACH statement is equal to the estimated cost of the SQL statement that will be generated to execute against the target DBMS.

The cost history data in the history file 36 is used, if possible, otherwise the cost is estimated by predicting the access path that will be selected by the target DBMS optimizer and estimating the cost of executing that path. The access path is estimated by searching over all the access paths that the target DBMS would consider and returning the one with the lowest cost. This search is bounded.

The following general heuristics are applied to all decisions made by the condition cost module 40 with respect to determining the access path taken by the target DBMS:

(1) ground first: do ground conditions (those involving only ground views) in preference to all others;

(2) connectivity: follow relationship conditions where available;

(3) arbitrary occurrence sequence: the sequence of accessing occurrences (i.e., views where there is at most one occurrence meeting the associated condition) is immaterial;

(4) occurrences before retrievals: occurrences are always accessed before retrieval views (i.e., views where there may be more than one occurrence meeting the associated condition); and (5) train of thought: access a view connected to the last non-occurrence view accessed, where possible.

These heuristics are applied consistently throughout the transformation. It is contemplated, however, that in another embodiment of the present invention, the condition cost module 40 could be implemented to use the same rules as would be used by the target DBMS optimizer.

Possible Extensions

Other features or concepts of the DBMS used in the current embodiment of the present invention, DB2™, which were omitted in the implementation of the condition cost module 40 in the current embodiment of the present invention include:

(a) Incomplete search over single occurrences—Single occurrences are accessed in an arbitrary sequence.

(b) Denormalization & Foreign keys—The cost model assumes that a view must be still accessed even if all its attributes are denormalized or foreign keys (although the concept of foreign keys is still included to a degree, and the filter factor relevant to the relationship optionality is still applied before accessing the occurrence). Limited issues are raised by including this, and are largely addressed by an earlier prototype.

(c) Indexes—The condition cost model 40 does not take into consideration indexes for identifiers, and assumes that an index for each relationship will be present (and no others). Limited issues raised by including actual information from the data structure design.

(d) Table Size & Page Size—A table size of 40 bytes is assumed for all tables, and a page size of 4000 bytes. Limited issues raised by including actual information from the data structure design.

(e) Other join methods—Only nested loop joins are included, while some DBMSs support additional methods (e.g., merge scan join, which becomes very relevant for large queries).

(f) Sort cost—Given other limitations that apply, no estimates of sort costs need be produced. Unlikely to raise significant issues.

(g) Table Space Segmentation & non-matching index scan— It is taken a safe assumption that the table space will be segmented, and therefore a non-matching index scan is not relevant.

(h) Index Page accesses & Index only access—No costs are included for accessing index pages, and correspondingly no account is made of cases where only the index need be accessed.

(i) Index Clustering—No account is taken of index clustering. The issues raised by including is that while a certain degree of clustering for a clustered index (>90%) can be assumed, no information is available on "accidental" clustering (therefore assuming 0%).

(j) CPU cost & Stage ½ predicates—No CPU costs are included.

(k) Free Space—The effect of the percentage free space can be included simply by adjusting the page size.

(l) Sequential Prefetch—Effects large queries.

In a second embodiment of the present invention, the levels of optimization could be extended to permit higher levels that, for example, (1) relax the "occurrences before retrievals" and the "train of thought" heuristics (these two should go together as they are both based upon the heuristic that a retrieval will return more than one result); and (2) additionally relax the "connectivity" heuristics.

Relaxing these heuristics allows the second embodiment of the present invention to find optimal solutions that might otherwise be excluded. However, to maximize the pruning back that occurs in the prune module 20, those options that obey the relaxed heuristics should be explored before exploring those that do not.

The implementation of a declarative language specification can include the generation of the necessary validation logic to check that the preconditions of the process are met. A specification:

[pre, post]: if pre is true, terminate in a state that satisfies post is initially rewritten into two specifications:
[true, ESCAPE←not(pre)]: always ESCAPE (i.e., perform no further processing) if pre is not met
[pre, post]: if pre is true, terminate in a state that satisfies post.

These two specifications are then independently implemented using the transformation, and the two resulting action diagrams appended to form the final result.

This trivial initial rewrite and subsequent append of the resulting action diagrams can be done manually, but it is also contemplated that it could be performed automatically as part of the transform module 12 in another embodiment of the present invention.

EXAMPLE

To further explain the current embodiment of the present invention, consider that the following set of rules must be transformed to an action diagram:

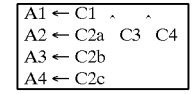

Figure 6:
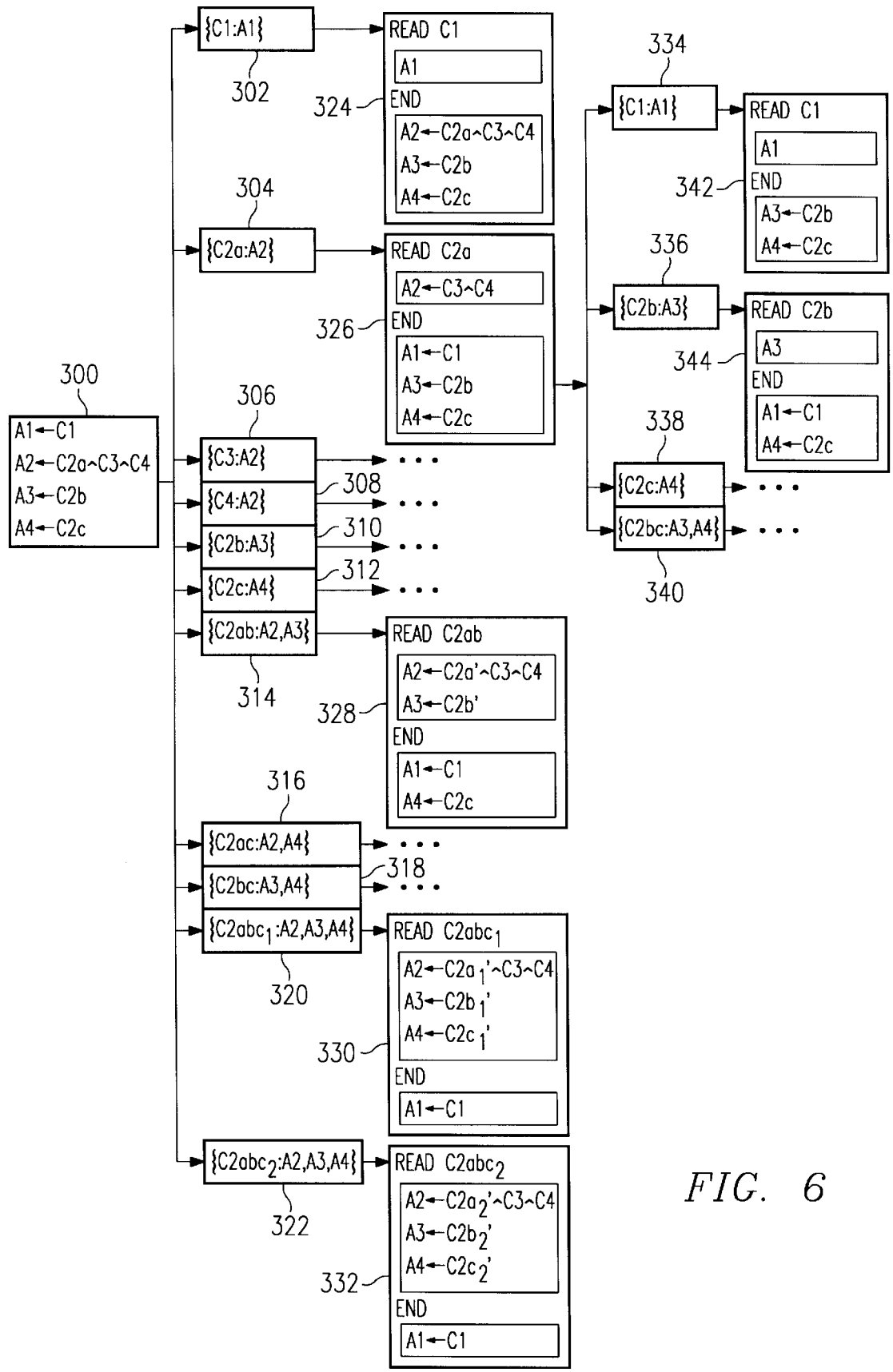
FIG. 6 shows an exemplary translation using the current embodiment of the present invention.

The diagram illustrated in FIG. 6 shows all of the options that are available for the refinement of those rules, shown at 300.

The representation used in FIG. 6 defining the options is described as:

A1←C2a^C3 ^C4 represents that some action A1 must be carried out if conditions C2a, C3 and C4 are all met (the action will be to set some attribute to some expression).

C2a, C3 etc. represent different conditions (not necessarily atomic).

C2a, C2b etc. represent the fact that the conditions overlap, i.e., we could share some effort between them. C2ab represents the part of the condition shared between them, and C2a' represents that part of the condition that will then still remain.

For example, the two conditions:

|     | CURRENT order is_placed_by SOME customer AND THAT customer type = 'A' |
| --- | --- |
| and | CURRENT order is_placed_by SOME customer AND THAT customer type = 'B' | can both be shared with:

| CURRENT order is_placed_by SOME customer |
| --- | with two remaining conditions:

|     | CURRENT customer type = 'A' |
| --- | --- |
| and | CURRENT customer type = 'B' |

{C1:A1} etc. represent selecting condition C1 as the next condition to be tested, including only the action A1 in the positive set of that test.

{C2ab:A2,A3} etc. represent selecting condition C2ab, the share d part of Ca and Cb, as the next condition to be tested, sharing effort between the two actions A2 and A3.

READ C1 . . . END represents the action diagram statement introduced by applying the refinement. Hence the action diagram resulting from selecting {C1:A1} would be

```
READ C1
        <the action diagram implementing [A1] >
END
        <the action diagram implementing [A2 ← C2a ^ C3 ^
        C4, A3 ← C2b, A4 ← C2c] >
```

{C2abc$_1$: A1,A2,A3} etc. represent selecting condition C2abc$_1$, which is one way that Ca, Cb, and Cc may be shared (the other being C2abc$_2$).

There are 11 options, shown at blocks 302 through 322, for the first refinement step:

select a single condition, without any sharing: we have 6 choices for the condition to select ({C1:A1}, {C2a:A2} etc.), shown at blocks 302 through 312 select a condition, sharing between two rules: the conditions that can be shared are Cb2a,C2b,C2c, so we have 3 choices, ({C2ab:A2,A3}, {C2ac:A2,A4} and {C2bc:A3,A4}), shown at blocks 314 through 318 select a condition, sharing between three rules: in this example, we consider that there are two options for this ({C2abc$_1$:A2,A3,A4} and {C2abc$_2$:A2,A3,A4}), shown at blocks 320 through 322. Such options arise for two reasons:

because it may be that only part of the overlap condition is chosen to share, in light of the access path that the target DBMS would follow; and if any condition includes a construct that the target DBMS does not support, there may be a number of different ways to work around it.

There are then many action diagrams that could be chosen to implement the sub-problems created, as shown at blocks 324 through 332. The set of options for the next refinement step are drawn for just one of the sub-problems, in particular, for the sub-problem shown at block 326.

Figure 7:
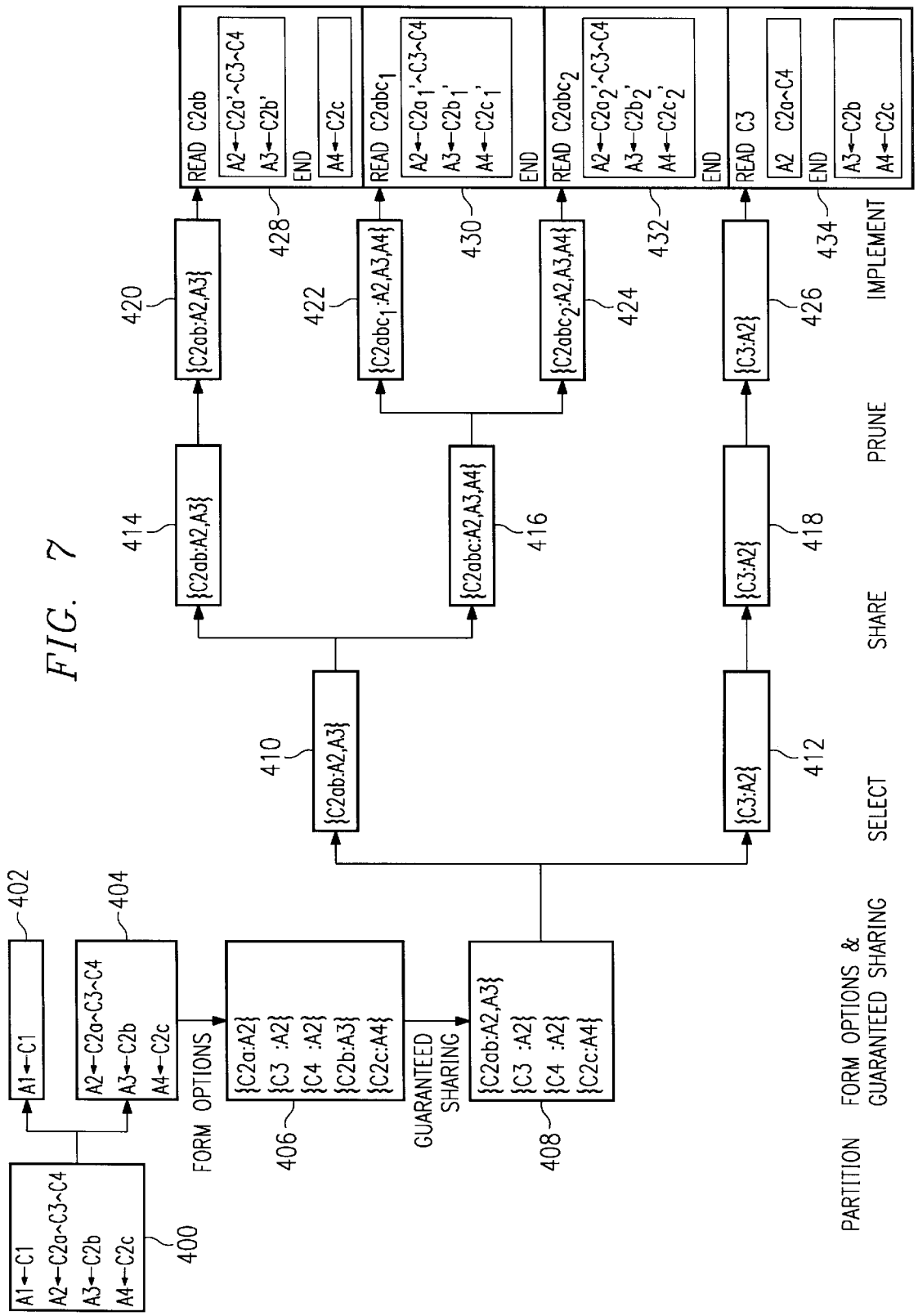
FIG. 7 shows in more detail a portion of the exemplary translation using the current embodiment of the present invention.

The way in which the transformation generates a subset of the 11 options shown at blocks 302 through 322 is represented diagrammatically in FIG. 7. Options need not be generated if it can be determined, possibly heuristically, that they will not result in any solutions that are superior to one resulting from an option that is already included.

First, set of rules is partitioned [partitioning module 16] into two independent sets, as shown for example at blocks 402 and 404, where it can be demonstrated that there will be no inefficiencies introduced by implementing the two sets totally independently and composing the resulting action diagrams (and no dependencies will be violated).

Considering the subsequent implementation of just one of these sets, at block 404, a list of options is then formed [form options module 20] as shown at block 406. This is simply a list of actions that could be taken next, and conditions that may be tested next, with the way in which each should be shared across different rules.

This options list is then updated [guaranteed sharing module 22] with all the sharing that is definitely a good idea, as determined heuristically (using the "Guaranteed Sharing" heuristics) at block 408. In block 408, it is determined, for example, that C2a and C2b should always be shared to C2ab.

A selection [select module 24] is then made from all the different conditions, to generate a smaller set of options that should be considered further, sequenced in order of preference, as shown at blocks 410 and 412. The selection and sequencing is conducted heuristically (using the "Selection" heuristics).

For each of the selected conditions, the options for sharing it with other conditions are generated (including having no sharing) [share module 26]. The options for sharing the selected conditions in block 410 are shown at blocks 414 and 416. The options for sharing the selected conditions in block 412 are shown at block 418. For example, given C2ab it may either not be shared with anything else, as shown at block 414, or it may be shared with C2c to give C2abc, as shown at block 416, (the entire overlap condition in common between Cab and Cc).

For each of these options in blocks 414, 416, and 418, the condition may then be "pruned" back [prune module 28] generating the options shown in blocks 420 through 426. As discussed hereinabove, pruning back the condition is done in order to share less than the entire overlap condition, or simply to work around a construct not supported by the target DBMS. Different options may be generated to reflect the different ways in which the pruning back could be done.

Finally, each of the options shown in blocks 420 through 426 will be implemented [implement module 30] which simply means introducing the necessary action diagram statement or statements, as shown in blocks 428 through 434, and recursively transforming the relevant sub-problems. Hence, in the example shown in FIG. 7, all the solutions where C2ab is selected as the chosen refinement are explored first before exploring C2abc$_1$, etc.

The set of options generated in each of the steps described hereinabove depends upon the level of optimization in effect.

Figure 8:
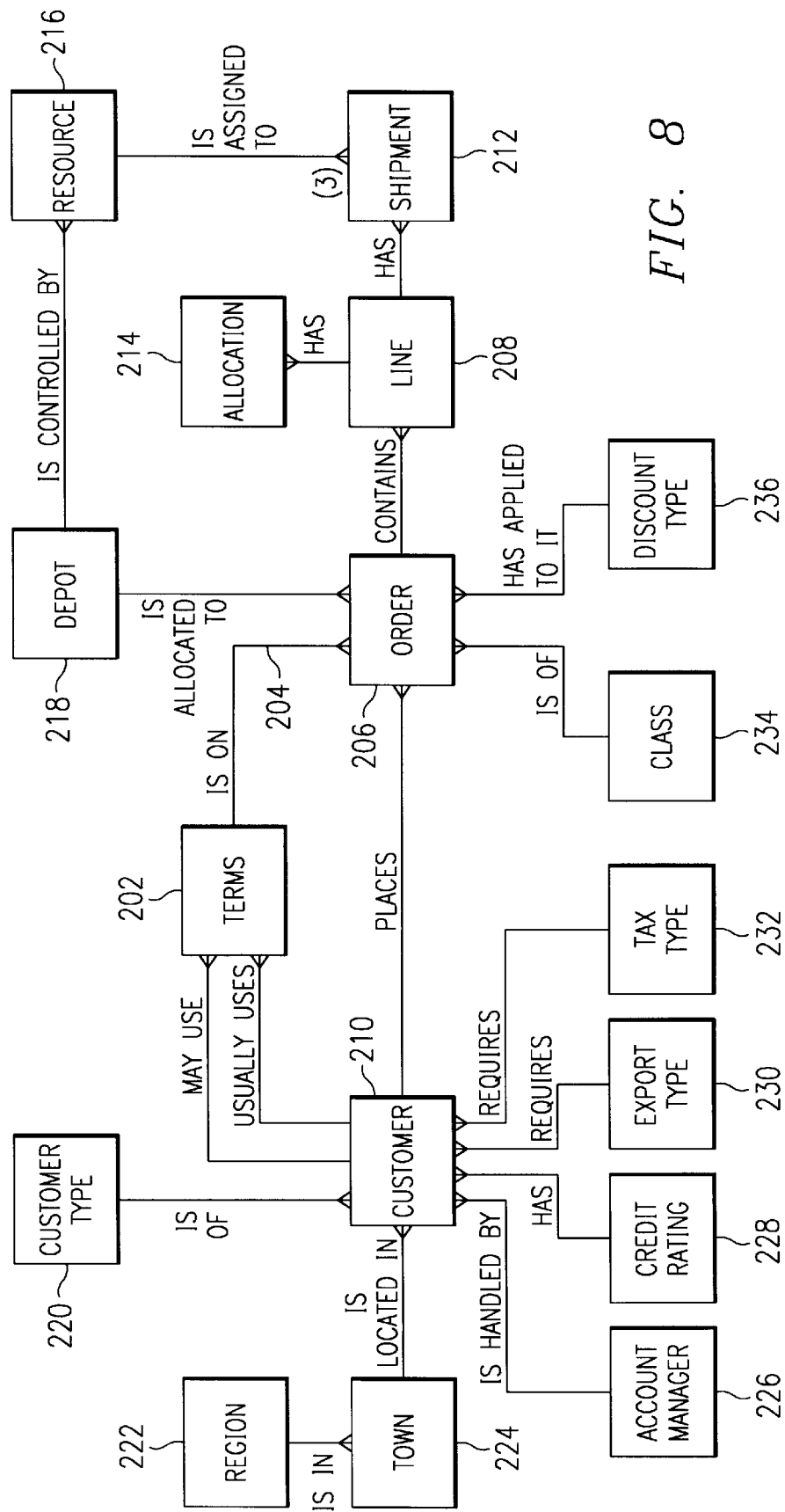
FIG. 8 illustrates an exemplary entity-relationship diagram.

An exemplary transformation of a READ statement and a set of derivation rules into an action diagram along with an exemplary transformation of preconditions are described in Appendix C, herein incorporated by reference in its entirety. The examples described in Appendix C are based upon the entity-relationship diagram shown in FIG. 8. The entity-relationship diagram in FIG. 8 illustrates each entity type as a box with the relationship between two entity types indicated by a label on a line drawn between the entity types. The lines drawn between two entity types also indicate cardinalities between the entity types and relationships. For example, the "is on" relationship at 204 from terms entity type 202 to order entity type 206 is a one-to-many relationship while the "is on" relationship at 204 from the order entity type 206 to the terms entity type 202 is a many-to-one relationship.

Although the present invention has been described in detail, it should be understood that various changes, substitutions and alterations can be made thereto without departing from the spirit and scope of the present invention as defined by the appended claims.

APPENDIX A: EXEMPLARY PROBLEM DATA STRUCTURE

The problem is defined as a set of rules that must be satisfied, given a set of views on which currency has already been determined (referred to as the ground views) and a set of dependencies that must be obeyed. Note that this is merely the way in which the [pre,post] specification is represented.
Each rule is an action to be carried out if some condition is met.

```
Problem =
      problem(RuleList         % the rules to be implemented
              GroundViewList   % the views that are currently
                               % ground
              DependencyList   % the dependencies that must be
                               % respected
             )

Rule =
      RuleReference : ActionDefinition <- Condition

ActionDefinition =
      obtain( View, RuleList )
            % represents the initial READ
            % Obtain each occurrence of the set of views in the ViewList
            % (that meet the condition of the rule for which this is an
            % action definition). For each occurrence, implement each of
            % the rules in the RuleList

| set(Attribute = Expression)
            % The attribute must be set to the Expression

|   increment( Attribute , Expression)
            % The attribute must be incremented by the Expression. This
            % type of action is only ever added during the transformation
    |   escape(ActionDiagramReference)
            % ESCAPE from the reference - 0 indicates entire action
            %diagram Condition =
      AtomicConditionList              % AND-ed conditions
    |    or( AtomicConditionList )     % OR-ed conditions AtomicCondition =
      Expression:1 = Expression:2
    |    relationship_name( View:1,  View:2) % relationship e.g.
                                             % stored_in(product,
                                             % location)

Expression =
      Attribute                    % on left hand side (lhs) of atomic
                                   % condition only
      Function                     % on lhs only
      total( Attribute, Condition)     % total of the attribute values on all
                                   % occurrences meeting the condition
                                   % no nesting permitted:
                                   % on right hand side(rhs)only
      SystemAdded
      Literal
Attribute =
      attribute_name( View)        % attribute of the view e.g.
                                   % cost(product)
```

TI-19197AA (35)

```
    Function =
        fn(Attribute)              % no nesting - on lhs only
    SystemAdded =
        Flag                       % flags represented as flag:n
        Accumulator                % accumulators represented as
                                          accumulator:n Dependency =
        RuleReference:1 : RuleReference:2    % the rule with reference
                                             % RuleReference:1 must be
                                             % implemented before the
                                             % rule with reference
                                             % RuleReference:2
```

APPENDIX B: EXEMPLARY REFINEMENT LIBRARY

Exemplary refinement laws included in the present invention are illustrated hereinbelow. The exemplary refinement laws are intended to show the scope and form of such refinement laws only. Not all details of the exemplary refinement laws are included. In particular, not all conditions that must be satisfied for a particular refinement law to be validly applied are included.

*IF Introduction*

Introduce an IF statement, forming specifications for both the positive branch and for the remaining logic that is independent of the result.

[Pre,

A1 <-CA1

A2 <-CA2

...

B1<-CB1

B2<-CB2

...]

refines to:

INITIALIZE flag 1

INITIALIZE flag 2

...

R:IF Ct

[Pre^Ct,

SET(flag 1='Y' <-Cf1+

SET(flag 2='Y' <-Cf2+

...

TI-19197AA (37)

A1<-CA1

A2<CA2 ...]

END IF: R

[Pre flag 1='Y' <-> Ct ^ Cf1+ flag 2='Y' <-> Ct ^ Cf2+,

B1<-CB1

B2<-CB2

...]

Ai <-CAi represent those rules that will participate in the test

Bi <-CBi represent those rules that will not participate directly in the test flagi represents unique flag introduced to represent the fact that the associated condition Cf+ was met The preconditions for the positive branch are extended with the knowledge of Ct. Using this knowledge, we can then apply logical simplifications to simplify CA1, CA2, etc.

The preconditions for the remaining branch are extended with the equivalence between the value of the flags introduced, and the associated condition. Using this knowledge, we can then apply logical simplifications to simplify CB1, CB2, etc.

The following conditions must be met:

-the conditions of all those rules that will participate in the test must imply the condition tested.

(ie CA->Ct)

*READ Introduction*

Introduce a READ statement, forming specifications for he positive branch and for the remaining logic that is independent of the result.

```
[Pre
A1<-CA1
A2<-CA2
...
B1<-CB1
B2<-CB2
...]
``` refines to:

INITIALIZE flag 1

INITIALIZE flag 2

...

R: READ [Vr1, Vr2 ...] WHERE Ct^Crg

WHEN SUCCESSFUL

[Pre^Ct^Crg ^ ground(Vr1, Vr2...),

SET(flag 1 = 'Y') <-Cf1+

SET(flag2= 'Y') <-Cf2+

...

A1+<-CA1+

A2+<-CA2+ ]

END READ: R

[Pre flag 1='Y' <-> Ct^Cf1 + ^ ground(Vr1, Vr2...)

flag2='Y' <-> Ct $^\wedge$ Cf2 +$^\wedge$ ground(Vr1, Vr2...),

B1<-CB1

B2<-CB2

... ]

Ai+<-CA+ represent those rules that will participate in the test, reflecting the currently obtained on Vr1, Vr2 ...

Bi<-CBi represent those rules that will not participate directly in the test.

Ct represents the condition being tested (generally the common part of the CAi's).

Crg represents any guard that we may be able to include on the read to further restrict the condition without effecting the rules or their conditions whilst reducing the probability that any occurrences need be returned.

flagi represents a unique flag introduced to represent the fact that an occurrence was found meeting the associated condition Ct$^\wedge$ Cf1+

```
    The preconditions or the positive branch are extended with
the knowledge of Ct^Crg, and the fact that the views are now
ground.  Using this knowledge, we can then apply logical
simplifications to simplify CA1, Ca2, etc.

The preconditions for the remaining branch are extended
with  the  equivalence  between  the  value  of  the  flags
introduced, and the associated condition and fact the views
are ground.  Using this knowledge, we can then apply logical
simplifications to simplify CB1, CB2, etc.

The following conditions must be met:

-we must be able to guarantee that only one occurrence (of
each view) will be retrieved, given Ct -the conditions of all those rules that will participate in
the test must imply the condition tested (ie CAi->Ct^Crg)

-Crg must be implied by each of the conditions in the
positive branch
```

*READ EACH Introduction*

Introduce a READ EACH statement, in order to calculate the value of aggregate expressions, and/or to determine the existence of an occurrence meeting certain conditions. This information may then be used in the rules as appropriate.

A number of flags and accumulators are initialized, and then within the body of the READ EACH loop the flags are set if an occurrence meets a certain condition, and the accumulators are incremented. We may escape from the loop under certain conditions. These flags and accumulators may then be exploited in the process that must be conducted upon completion of the READ EACH.

[Pre,

A1<-CA1

A2<-CA2

...]

refines to:

INITIALIZE flag1

INITIALIZE flag2

...

INITIALIZE accum1

INITIALIZE accum2

...

R: READ EACH [vR1, vR2 ...] WHERE Ct ∧ Crg

[Pre^Ct∧Crg^ ground(Vr1, Vr2...),

SET (flag1='Y') <-Cf1+^flag1='N' ^Cf1_independent_guard

SET (flag2='Y') <-Cf2+^flag2='N' ^Cf2_independent_guard

```
            ...
            INCREMENT(accum1, expr1+)<-Ca1_independent_guard
            INCREMENT(accum2, expr2+)<-Ca2_independent_guard
            ...
            ESCAPE (R) <- C_escape_condition]
        END READ EACH: R

[Pre
        flag1='Y' <-> Ct^Cf1+<-Cf1_independent_guard
        flag2='Y' <-> Ct^Cf2+<-Cf2_independent_guard
        accum1=TOTAL(expr1+, Ct) ) <-Ca1_independent_guard
        accum 2=TOTAL(expr2+, Ct) ) <-Ca2_independent_guard,

A1<-CA1
        A2<-CA2
        ... ]
```

Ai<-CAi represent those rules that will not participate directly in the test. However, they may(by later use of logical simplification) exploit the flags and accumulators set within the READ EACH

Ct represents the condition being tested (I.E. that we want to be satisfied by all occurrences returned).

Crg represents any guard that we may be able to include on the read(in a similar manner to the 'READ Introduction ' refinement).

flagi represents a unique flag introduced to represent the fact that an occurrence was found meeting the associated condition Ct^Cfi+

The rule to set th flag within the loop body may contain two additional conditions that merely ensure that we do not waste any effort on any single iteration:

-the iteration guard condition flag = 'N' ensures that we do not bother testing whether this occurrence meets Cf1+ if such and occurrence has already been found on a previous iteration -the condition Cf_independent_guard guards the rule, in that we will not bother with the existence test at all unless that guard condition is met. This would be a condition from some other part of the rule in which the existence test appears.

Both of these conditions may be omitted if Cf1+ is trivial accumi represents a unique accumulator introduced, into which the total of expri for the occurrences meeting Ct will be calculated

The INCREMENT rules may also contain an independent guard, in a similar manner to the rules to set flags.

As discussed above, each rule within the READ EACH may be guarded with a condition ensuring that, on any iteration, we do not waste effort. We may therefore add an ESCAPE rule to ensure that once none of these guard conditions hold, we do not continue with any subsequent iterations. The condition Cescape_condition is therefore the disjunction of the negotiation of all the guards The preconditions for the positive branches are extended with the knowledge of $Ct^{\wedge}Crg$, and the fact that the views are now ground.

The preconditions for the remaining branch are extended with the facts now known:

-the equivalence between the value of the flags introduced, and their associated condition -the equivalence of the accumulators and their associated aggregates The following conditions must be met:

-correct calculation of aggregate expressions: we must be able to demonstrate that the aggregate expressions exprea are correctly evaluated, in particular that the subjects of the aggregates expressions will only be retrieved once and once only

TI-19197AA (43)

-primed reference in Cescape_condition: any references to flagi, or accumi within the escape condition must be primed, to ensure that they refer to the final values such that the normal processing for dependencies will ensure that the rule is conducted after the rules setting those attributes -Crg must be implemented by each of the conditions in the positive branch

READ EACH Introduction (for OBTAIN rule)

Introduce a READ EACH statement in order to obtain currency (or make progress toward obtaining currency) on the subjects of the OBTAIN rule.

[Pre

OBTAIN ( [V1, V2...], Rules) <-C]

refines to:

R: READ EACH [Vr1, Vr2...] WHERE Ct

[Pre $^\wedge$ Ct $^\wedge$ ground(vr1, Vr2...),

OBTAIN( [V1+V2+...], Rules+) <-Crem]

END READ EACH: R

Rules+ represents the new set of Rules, reflecting the currency obtained on Vr1, Vr2 ...

V1+V2+... similarly reflect the currency established on Vr1, Vr2...

Crem represents the condition still remaining

The preconditions for the body of the READ EACH are extended with the fact that the condition Ct is known to hold, and that the views read are now ground The following conditions must be met:

-all occurrences retrieved: we must be able to demonstrate that all the required occurrences of V1, V2... will be retrieved. We must therefor prove that the condition on the READ EACH must be obeyed by all those occurrence i. e.:

For all V1, V2...[C->Ct]

-no repeated retrievals: we must be able to demonstrate that the required occurrences of V1, V2... will only be retrieved once. We must therefore prove that, under the scenario that V1, V2... are ground, there could only be one occurrence of Vr1, Vr2... that meets the condition C.

*SET Introduction*

Having gained currency on all occurrences necessary, and satisfied the necessary conditions, introduce a SET statement to satisfy a SET rule

[Pre

SET (attribute=expression)

Rules refines to:

R: SET attribute TO expression

[Pre $^\wedge$ attribute = expression,

Rules]

*INCREMENT Introduction*

Having gained currency on all occurrences necessary, and satisfied the necessary conditions, introduce an INCREMENT statement to satisfy an INCREMENT rule

[Pre

INCREMENT (attribute, expression)

Rules]

refines to:

R: INCREMENT attribute BY expression

[Pre, Rules]

*ESCAPE Introduction*

Having satisfied the necessary conditions, introduce an ESCAPE statement to satisfy an ESCAPE rule

[Pre

ESCAPE (Re)

Rules ]

refines to:

R: ESCAPE FROM Re

The following conditions must be met:

-all other rules must also have a definition of ESCAPE FROM Re

*Partition Rules*

Partition rules into independent sets that can be implemented sequentially

[Pre, Post]

refines to:

[Pre, Post1]

[Pre^Post1, Post]

*Logical Simplification*

Rewrite the specification to a logically equivalent form. In conducting this rewrite we may, of course, assume that the preconditions hold.

Many of the refinement laws above are defined such that their effect is primarily to extend the preconditions. Hence it is not until we employ those extensions via a logical simplification that we see progress being made.

[Pre, Post]

refines to:

[Pre, New Post]

New_Post represents the postconditions following the rewrite

The following conditions must be met:

-new postconditions imply original postconditions: we must be able to demonstrate that if the new post conditions hold, then so will the original postconditions given that the preconditions hold (i.e. New_Post^Pre->Post)

APPENDIX C: EXEMPLARY TRANSFORMATION

This appendix includes an exemplary transformation of a read statement and a set of derivation rules into an action diagram and an exemplary transformation of preconditions into an action diagram. The examples included in this Appendix are based upon the entity relationship diagram shown in Fig. 8.

The following rules were defined for the order 206, line 208 and customer 210 entity types in the exemplary entity relationship diagram shown in Fig. 8.

For clarity, the rules are expressed using a syntax that is compatible with the action diagram language, and the problem is expressed as a READ EACH statement which must be transformed into an action diagram that carries out the READ EACH and satisfies all the rules of the customer entity type 210. The conversion of the problem from this form to the problem data structure described in Appendix A is not included.

ORDER quantity IS EQUAL TO THE TOTAL OF ITS line quantity completed_quantity IS EQUAL TO THE TOTAL OF ITS completed_line quantity

AN order IS A current_years_order IF order date IS EQUAL TO CURRENT_YEAR

AND ITS class back_order_indicator IS EQUAL TO "N"

AN order IS AN undiscounted_order IF

ITS discount_type category IS EQUAL TO "UNDISCOUNTED"

LINE

A line IS A completed_line IF quantity IS EQUAL TO THE TOTAL OF ITS shipment quantity

CUSTOMER

TI-19197AA (48)

distance_from_main_depot IS EQUAL TO ITS town distance_from_main_depot direct_delivery_indicator IS EQUAL TO ITS town direct_delivery_indicator use_main_depot_indicator IS EQUAL TO "Y" IF ITS region category IS EQUAL TO 1 authorization_required_indicator IS EQUAL TO "Y" IF

ITS account_manager category IS EQUAL TO "NORMAL"

AND ITS account_manager level IS EQUAL TO 1

AND ITS credit_rating category IS EQUAL TO "NORMAL"

total_sales_quantity IS EQUAL TO THE TOTAL OF ITS order quantity usual_terms_sales_quantity IS EQUAL TO

THE TOTAL OF ITS order quantity WHERE

IT usually_uses SOME terms AND

THAT order is_on THAT terms total_ytd_completed_sales_quantity IS EQUAL TO

THE TOTAL OF ITS current_years_order completed_quantity pending_shipment_quantity IS EQUAL TO

THE TOTAL OF shipment quantity WHERE

IT places SOME order

AND THAT order contains SOME line

AND THAT line has SOME shipment

AND SOME resource is_assigned_to THAT shipment

AND THAT resource is_controlled_by SOME depot

AND THAT order is_allocated_to THAT depot entered_allocation_quantity IS EQUAL TO

THE TOTAL OF ITS entered_allocation quantity confirmed_allocation_quantity IS EQUAL TO

THE TOTAL OF ITS confirmed_allocation quantity export_indicator IS EQUAL TO "Y" IF ITS export_type active_flag IS EQUAL TO "Y"

taxed_indicator IS EQUAL TO "Y" IF ITS tax_type active_flag IS EQUAL TO "Y"

documentation_required_indicator IS EQUAL TO "Y" IF

ITS export_type category IS EQUAL TO ITS tax_type category primary_indicator IS EQUAL TO "Y" IF

THE TOTAL OF ITS order value IS EQUAL TO 2000

AND THE TOTAL OF ITS undiscounted_order value IS EQUAL TO 1000

A customer IS AN active_customer IF fn(ITS customer_type active_date) IS EQUAL TO 0

The read statement to be transformed was:

READ EACH active_customer

The transformation then generated logic satisfying all the rules of customer 210, resulting in the following exemplary action diagram:

267: READ EACH customer_type

268: IF fn(customer_type active_date) IS EQUAL TO 0

269: READ EACH customer WHERE DESIRED customer is_of CURRENT customer_type

50: INITIALIZE accumulator:49

47: INITIALIZE accumulator:46

44: INITIALIZE accumulator:43

41: INITIALIZE accumulator:40

38: INITIALIZE accumulator:37

35: INITIALIZE accumulator:34

52: READ EACH order WHERE CURRENT customer places DESIRED order

155: INCREMENT accumulator:40 BY order value

54: INITIALIZE flag:53

56: READ depot WHERE CURRENT order is_allocated_to DESIRED depot

WHEN SUCCESSFUL

55: SET flag:53 TO "Y"

END:56

58: INITIALIZE flag:57

60: IF order date IS EQUAL TO CURRENT_YEAR

61: READ class WHERE CURRENT order is_of DESIRED class

AND DESIRED class back_order_indicator IS EQUAL TO "N"

WHEN SUCCESSFUL

59: SET flag:57 TO "Y"

END:61

END:60

92: READ EACH line WHERE CURRENT order contains DESIRED line

117: INCREMENT accumulator:34 BY line quantity

106: INITIALIZE accumulator:105

109: IF <- (flag:53 IS EQUAL TO "Y" OR flag:57 IS EQUAL TO "Y")

110: READ EACH shipment WHERE

CURRENT line has DESIRED shipment

114: INCREMENT accumulator:105 BY shipment quantity

111: IF flag:53 IS EQUAL TO "Y"

112: READ resource WHERE

DESIRED resource is_controlled_by CURRENT depot

AND DESIRED resource is_assigned_to

CURRENT shipment

WHEN SUCCESSFUL

TI-19197AA (51)

```
113: INCREMENT accumulator:43 BY shipment quantity
    END:112
    END:111
    END:110
    END:109
    115: IF flag:57 IS EQUAL TO "Y"
        AND line quantity IS EQUAL TO accumulator:105
        116: INCREMENT accumulator:37 BY line quantity
    END:115
    69: READ EACH allocation WHERE
        (DESIRED allocation status IS EQUAL TO confirmed
        OR DESIRED allocation status IS EQUAL TO entered)
        AND CURRENT line has allocation
        70: IF allocation status IS EQUAL TO entered
            71: INCREMENT accumulator:46 BY allocation quantity
        END:70
        72: IF allocation status IS EQUAL TO confirmed
            73: INCREMENT accumulator:49 BY allocation quantity
        END:72
    END:69
    END:92
END:52
181: SET customer pending_shipment_quantity TO accumulator:43
161: INITIALIZE accumulator:160
163: IF 2000 IS EQUAL TO accumulator:40
    164: READ EACH discount_type, order WHERE
        DESIRED order has_applied_to_it DESIRED discount_type
        AND CURRENT customer places DESIRED order #
```

TI-19197AA (52)

AND DESIRED discount_type category IS EQUAL TO "UNDISCOUNTED"

165: INCREMENT accumulator:160 BY order value

END:164

END:163

172: IF 2000 IS EQUAL TO accumulator:40 AND 1000 IS EQUAL TO accumulator:160

173: SET customer primary_indicator TO "Y"

END:172

167: INITIALIZE accumulator:166

169: READ EACH terms,order WHERE

DESIRED order is_on DESIRED terms

AND CURRENT customer places DESIRED order

AND CURRENT customer usually_uses DESIRED terms

170: INCREMENT accumulator:166 BY order quantity

END:169

171: SET customer usual_terms_sales_quantity TO accumulator:166

159: SET customer total_ytd_completed_sales_quantity TO accumulator:37

158: SET customer entered_allocation_quantity TO accumulator:46

157: SET customer total_sales_quantity TO accumulator:34

156: SET customer confirmed_allocation_quantity TO accumulator:49

26: INITIALIZE flag:25

28: READ export_type WHERE customer requires export_type

WHEN SUCCESSFUL

27: SET flag:25 TO "Y"

29: IF export_type active_flag IS EQUAL TO "Y"

30: SET customer export_indicator TO "Y"

END:29

END:28

TI-19197AA (53)

```
31: READ tax_type WHERE (DESIRED tax_type active_flag IS EQUAL TO "Y"

OR export_type category IS EQUAL TO DESIRED tax_type category

AND flag:25 IS EQUAL TO "Y")

AND CURRENT customer requires DESIRED tax_type
WHEN SUCCESSFUL

23: IF  tax_type active_flag IS EQUAL TO "Y"

24: SET customer taxed_indicator TO "Y"

END:23

32: IF  flag:25 IS EQUAL TO "Y"

AND export_type category IS EQUAL TO tax_type category

33: SET customer documentation_required_indicator TO "Y"

END:32

END:31

11: READ account_manager WHERE

CURRENT customer is_handled_by DESIRED account_manager

AND DESIRED account_manager category IS EQUAL TO "NORMAL"

AND DESIRED account_manager level IS EQUAL TO 1
WHEN SUCCESSFUL

12: READ credit_rating WHERE

DESIRED credit_rating category IS EQUAL TO "NORMAL"

AND CURRENT customer has DESIRED credit_rating

WHEN SUCCESSFUL

13: SET customer authorization_required_indicator TO "Y"

END:12

END:11

3: READ town WHERE CURRENT customer is_located_in DESIRED town
WHEN SUCCESSFUL
```

```
                7: SET customer direct_delivery_indicator TO town direct_delivery_indicator
                5: READ region WHERE DESIRED region category IS EQUAL TO 1
                        AND CURRENT town is_in DESIRED region
                    WHEN SUCCESSFUL
                        6: SET customer use_main_depot_indicator TO "Y"
                    END:5
                4: SET customer distance_from_main_depot TO town
                        distance_from_main_depot
            END:3
        END:269
    END:268
END:267
```

Example transformation of preconditions

The following preconditions were defined for a process:

| Precondition | Owner | Violation Condition |
|---|---|---|
| p1 | order | active_flag IS EQUAL TO "N" |
| p2 | order | ITS discount_type active_flag IS EQUAL TO "N" |
| p3 | order | ITS tax_type active_flag IS EQUAL TO "N" |
| p4 | order | ITS export_type active_flag IS EQUAL TO "N" |
| p5 | order | quantity IS EQUAL TO 0 |

TI-19197AA  (55)

| | | |
|---|---|---|
| p6 | order | authorized IS EQUAL TO "N" |
| | | AND ITS customer authorization_required_indicator IS EQUAL TO "Y" |
| p7 | order | ITS class preinvoice_indicator IS EQUAL TO "N" |
| | | AND completed_quantity IS EQUAL TO 0 |

A precondition is violated if its associated condition is met. The example is under the scenario that currency on order has already been achieved. The preconditions must be checked in the sequence p1 to p7.

The transformation then generates the following validation logic that ensures that no preconditions are violated:

41: IF order active_flag IS EQUAL TO "N"

42: ESCAPE FROM 0 : p1

END:41

39: READ discount_type WHERE

DESIRED discount_type active_flag IS EQUAL TO "N"

AND CURRENT order has_applied_to_it DESIRED discount_type

WHEN SUCCESSFUL

40: ESCAPE FROM 0 : p2

END:39

37: READ tax_type WHERE

DESIRED tax_type active_flag IS EQUAL TO "N"

AND CURRENT order has_applied_to_it DESIRED tax_type

WHEN SUCCESSFUL

38: ESCAPE FROM 0 : p3

END:37

35: READ export_type WHERE DESIRED export_type active_flag IS EQUAL TO "N"

AND CURRENT order has_applied_to_it DESIRED export_type

WHEN SUCCESSFUL

36: ESCAPE FROM 0 : p4

END:35

2: INITIALIZE flag:1

4: READ class WHERE

DESIRED class preinvoice_indicator IS EQUAL TO "N"

AND CURRENT order is_of DESIRED class

WHEN SUCCESSFUL

3: SET flag:1 TO "Y"

END:4

9: INITIALIZE accumulator:8

6: INITIALIZE accumulator:5

11: READ EACH line WHERE CURRENT order contains DESIRED line

20: INCREMENT accumulator:5 BY line quantity

12: IF flag:1 IS EQUAL TO "Y"

14: INITIALIZE accumulator:13

16: READ EACH shipment WHERE CURRENT line has DESIRED shipment

17: INCREMENT accumulator:13 BY shipment quantity

END:16

18: IF line quantity IS EQUAL TO accumulator:13

19: INCREMENT accumulator:8 BY line quantity

END:18

END:12

END:11

21: IF 0 IS EQUAL TO accumulator:5

22: ESCAPE FROM 0 : p5

END:21

25: IF order authorized IS EQUAL TO "N"

TI-19197AA (57)

```
26: READ account_manager,customer,credit_rating WHERE
    DESIRED credit_rating type IS EQUAL TO "NORMAL"
    AND DESIRED customer has DESIRED credit_rating
    AND DESIRED customer places CURRENT order
    AND DESIRED customer is_handled_by DESIRED account_manager
    AND DESIRED account_manager level IS EQUAL TO 1
    AND DESIRED account_manager type IS EQUAL TO "NORMAL"
    WHEN SUCCESSFUL
        27: ESCAPE FROM 0 : p6
    END:26
END:25
23: IF flag:1 IS EQUAL TO "Y" AND 0 IS EQUAL TO accumulator:8
    24: ESCAPE FROM 0 : p7
END:23
```

The syntax ESCAPE FROM 0 means escape from the entire action block, with the precondition name being included to make it easier to verify that the required sequence of precondition checking has been maintained.

What is claimed is:

1. An automated method of transforming a declarative language specification of a problem into a procedural language specification of said problem using a computer, said computer including a memory, comprising the steps of:

applying a plurality of refinement laws and domain specific heuristics to said declarative language specification to generate a plurality of procedural language implementations in accordance with a given optimization level;

determining a cost associated with each of said plurality of procedural language implementations; and selecting a portion of said plurality of procedural language implementations to form said procedural language specification of said problem in accordance with said cost.

2. The method of claim 1 further including the step of providing a predetermined execution time and said applying step further includes the step of reducing said given optimization level in order to complete said transformation within said predetermined execution time.

3. The method of claim 1, wherein said determining step includes the step of determining said cost associated with said each of said alternative procedural language implementations in terms of disk page accesses.

4. The method of claim 1, wherein said applying step includes the step of providing said refinement laws determined in accordance with said declarative language, said procedural language and said problem.

5. The method of claim 1 wherein said determining step includes the step of determining an access plan selected by a target database management system for said procedural language specification to generate said cost associated with said each of said procedural language implementations.

6. The method of claim 1 wherein said applying step includes the step of retrieving previous procedural language implementations of said problem from a history file stored in said memory of said computer.

7. A method for transforming a declarative language specification of a problem into a procedural language specification of said problem on a computer, said computer including a memory, comprising the steps of:

providing said declarative language specification of said problem in said memory of said computer;

providing a library of refinement laws in said memory of said computer;

providing a set of domain specific heuristics in said memory of said computer;

partitioning said problem into a set of sequenced, independent sub-problems using said domain specific heuristics and said refinement laws;

generating procedural language implementations of each of said sub-problems using said domain specific heuristics and said refinement laws in accordance with a given optimization level;

repeating said partitioning and generating steps for additional sub-problems generated in response to said generated step; and selecting a portion of said procedural language implementations in said memory of said computer in accordance with a cost associated with each of said procedural language implementations to generate said procedural language implementation of said problem.

8. A method for transforming a declarative language specification of a problem into a procedural language specification of said problem on a computer, said computer including a memory, comprising the steps of:

providing said declarative language specification of said problem in said memory of said computer;

providing a library of refinement laws in said memory of said computer;

providing a set of domain specific heuristics in said memory of said computer;

partitioning said problem into a set of sequenced, independent sub-problems using said domain specific heuristics and said refinement laws;

generating procedural language implementations of each of said sub-problems using said domain specific heuristics and said refinement laws in accordance with a given optimization level, each of said procedural language implementations having an associated cost;

repeating said partitioning and generating steps for additional sub-problems generated in response to said generated step while said associated cost of said each of said procedural language implementations is less than a minimum cost of said procedural language implementations already generated; and selecting a portion of said procedural language implementations in said memory of said computer in accordance with a cost associated with each of said procedural language implementations to generate said procedural language implementation of said problem.

9. A method for transforming a declarative language specification of a problem into a procedural language specification of said problem on a computer, said computer including a memory, comprising the steps of:

(a) providing said declarative language specification of said problem in said memory of said computer;

(b) providing a library of refinement laws in said memory of said computer;

(c) providing a set of domain specific heuristics in said memory of said computer;

(d) partitioning said problem into a set of sequenced, independent sub-problems using said domain specific heuristics and said refinement laws, said sub-problem defined in terms of rules, said rules including conditions and actions;

(e) generating a first options list between each of said plurality of conditions and each of said declarative language rules;

(f) applying guaranteed sharing heuristics to said first options list, thereby generating a second options list;

(g) applying selection heuristics to said second options list, thereby generating a third options list, said third options list including a plurality of selected conditions;

(h) applying non-guaranteed sharing heuristics to each of said plurality of selected conditions in said third options list, to generate a fourth options list, said fourth options list including a plurality of shared conditions;

(i) pruning said plurality of shared conditions in said fourth options list to generate a fifth options list, said fifth options list including a plurality of pruned conditions;

(j) generating procedural language implementations of said declarative language statements from said pruned conditions in said fifth options list;

(k) determining a cost associated with each of said procedural language implementations;

(l) repeating steps (e) through (k) for each of said sub-problems; and (m) selecting a subset of said procedural language implementations in accordance with said cost to generate said procedural language implementation of said problem.

10. A system for translating a declarative language specification of a problem into a procedural language specification of said problem, said declarative language specification of said problem defined in terms of rules, comprising:

a transform module for performing initialization;

a transform with partitioning module coupled to said transform module for controlling transformation of sub-problems generated;

a partitioning module coupled to said transform with partitioning module for partitioning said problem into a sequenced set of independent sub-problems;

a trans module coupled to said transform with partitioning module for transforming each of said sub-problems in accordance with a history of previous problems transformed and a given optimization level;

a form options module coupled to said trans module for generating a list of options for one of said sub-problems and for decomposing each of said rules into its component conditions;

a guaranteed sharing module coupled to said trans module for updating said options list in accordance with a determination as to which of said conditions should definitely be shared with another of said conditions to generate an updated options list;

a selection module coupled to said trans module for determining from said updated options list which of said options should be processed next to generate a selection options list;

a share module coupled to said trans module for generating a shared options list, said shared options list defining how one of said options in said selection options list can be shared with at least one other option in said selection options list;

a prune module coupled to said share module for generating options, each of said options defining how said conditions of said selection options list can be reduced;

an implement module coupled to said trans module for generating a procedural language specification of said one of said options; and a condition cost module coupled to said implement module for generating a cost associated with said procedural language specification.

* * * * *